United States Patent [19]

Vitali

[11] Patent Number: 5,431,096
[45] Date of Patent: Jul. 11, 1995

[54] MALE POT FOR CACAO AND OIL SEED PRESSES

[76] Inventor: Antonio Vitali, Via Piedimonte, 34, 22049 Valmadrera (Como), Italy

[21] Appl. No.: 273,507

[22] Filed: Jul. 11, 1994

[30] Foreign Application Priority Data

Jul. 12, 1993 [IT] Italy ............... MI93A1532

[51] Int. Cl.[6] ............................................. B30B 9/26
[52] U.S. Cl. ............................ 100/125; 100/115; 100/116; 100/297; 210/489
[58] Field of Search ............... 100/113–116, 100/125, 297; 210/230, 231, 489, 498

[56] References Cited

U.S. PATENT DOCUMENTS

| | | | |
|---|---|---|---|
| 1,755,353 | 4/1930 | Hubbert | 100/116 |
| 1,767,078 | 6/1930 | Johnson | 100/297 |
| 2,178,416 | 10/1939 | Bausman | 100/116 |
| 2,714,849 | 8/1955 | Carver | 100/115 |
| 3,073,238 | 1/1963 | Vitali | 100/115 |
| 4,633,775 | 1/1987 | Kruiver | 210/231 |
| 4,684,466 | 8/1987 | Terpstra | 100/116 |
| 5,169,523 | 12/1992 | Carle et al. | 100/125 |

*Primary Examiner*—Stephen F. Gerrity
*Attorney, Agent, or Firm*—Bucknam and Archer

[57] ABSTRACT

A male pot for presses for pressing cacao and oil seed has a body provided, on the opposite surfaces thereof facing the press pots, with a disc-shaped element rigid with the body and defining channels for draining therefrom the liquid portion separated by the pressed seed mass, a fine filtering cloth to be mounted on the edge of the press being associated with the disc-shaped element.

2 Claims, 4 Drawing Sheets

MALE POT FOR CACAO AND OIL SEED PRESSES

BACKGROUND OF THE INVENTION

The present invention relates to a male pot for cacao and oil seed presses.

As is known, hydraulic presses for pressing a mass of cacao and oil seed conventionally comprise a plurality of pressing chambers therethrough the material to be pressed is caused to pass by several systems, such as pressure and gravity.

The pressing chambers are formed by coupling male elements, the so-called male pots, and female elements, the so-called pots.

On the two sides of the male element there are provided, in all of the existing presses, two replaceable disc elements which are called "filter bearing plates" and support filtering cloth elements.

The filtering cloth elements, depending on the press type, can be two or three and operate to filter the cacao butter or oil from the solid part.

This operation is performed by applying to the cloth elements a high pressure, aiding the separation of the liquid material from the solid material.

The hydraulic press male pots of prior presses there support two filtering plates, which can be connected to the male pot by different means, depending on the press type.

Conventionally used connection systems comprise a threaded central pin, where the plate is threaded to the male pot, or three pins which are bayonet coupled on the male pot, or a central pin, which is affixed on the male pot by a cross screw transversely extending with respect to the male pot.

Said plates are connected to the press male pot in order to allow it to be easily disassembled and reassembled.

This latter operation, in particular, is very difficult, since on the plates there are mounted the filtering cloth elements which must be of an interexchangeable type.

The filtering cloth elements comprise a fine filtering cloth, provided for directly contacting the product to be pressed, and which is applied on the press plates, as well as a supporting cloth arranged under the fine cloth for supporting the latter.

In particular, in prior presses, the fine cloth is affixed to the plate, whereas the supporting cloth is held on the plate through the fine cloth.

Because of this arrangement, it is necessary to mount the cloth elements on the plate held in a horizontal position, that is in a horizontal plane.

Moreover, the plates must be frequently disassembled from and applied again to the male pot of the press for replacing the worn cloth elements and since said plates, which are made of a comparatively high strength material, are frequently deformed under the high operating pressures.

In fact, the outer periphery of a plate, which slides inside the female portion or pot, tends to seize because of its small contact surface in which is formed a recess for engaging the sealing gasket of the pressing chamber, which gasket is usually made of a felt material.

Each filtering plate has an average weight of 30/35 kg and, as it is mounted on the press, it will reach an operating temperature of about 80°/90° C.

As it should be easily apparent, the disassembling of the plates from the press and the handling thereof originate great problems both from an accident standpoint, because of the high weight and temperature and from the economic standpoint, since the time required for disassembling said plates is comparatively long and represents a dead time for the press system.

In this connection it should be pointed out that these presses usually comprise 10-12-14 pots, whereas the related male pots, each of which includes two plates, require the use of 20-24-28 plates.

Accordingly, considering that a cacao or oil seed pressing shop is usually provided with two presses, there are necessary many plates, with a consequent high capital investment, also considering the high unit cost of each individual plate.

Moreover, the cacao butter and oil filtered by the filtering cloth elements is caused to pass through a plurality of holes formed through the plates for allowing liquid material to be conveyed into the male pot and then evacuated therefrom.

Because of this reason, the greater is the filtering surface of a plate, the smaller will be the time necessary for said liquid material to pass through said plate to be drained.

Since in prior plates some regions of said plates are occupied by means for connecting the plates to the press, it is not possible to carry out a homogeneous removal of the fat material which, remaining in the solid panel, will represent a loss.

SUMMARY OF THE INVENTION

Accordingly, the aim of the present invention is to overcome the above mentioned drawbacks, by providing a new type of male pot for presses for pressing cacao and oil seeds, which does not require to use conventional plates on the male pots, thereby greatly simplifying the maintenance operations.

Within the scope of the above mentioned aim, a main object of the present invention is to provide a male pot allowing to quickly and easily periodically replace the filtering cloth elements directly from a side of the press, without the need of arranging the assembly on a horizontal plane.

Another object of the present invention is to provide a male pot requiring a single cloth adapted to be easily assembled and which is very reliable in operation.

Yet another object of the present invention is to provide such a male pot which can be also applied to existing presses and which, moreover, is very advantageous from a mere economic standpoint.

According to one aspect of the present invention, the above mentioned aim and objects, as well as yet other objects, which will become more apparent hereinafter, are achieved by a male pot for presses for pressing cacao and oil seeds, characterized in that said male pot comprises a body provided, on opposite surfaces thereof facing said press pots, a disc-shaped element, rigid with said body and defining channels for draining therefrom the liquid part separated from the pressed material, to said disc-shaped element being applied a filtering cloth which can be assembled at an edge portion of the press.

BRIEF DESCRIPTION OF THE DRAWINGS

Further characteristics and advantages of the present invention will become more apparent hereinafter from the following detailed disclosure of a preferred, though not exclusive, embodiment of the male pot for presses for pressing cacao and oil seeds, which is illustrated, by way of an indicative, but not limitative, example in the figures of the accompanying drawings, where.

DESCRIPTION OF THE PREFERRED EMBODIMENT

Figure 1:
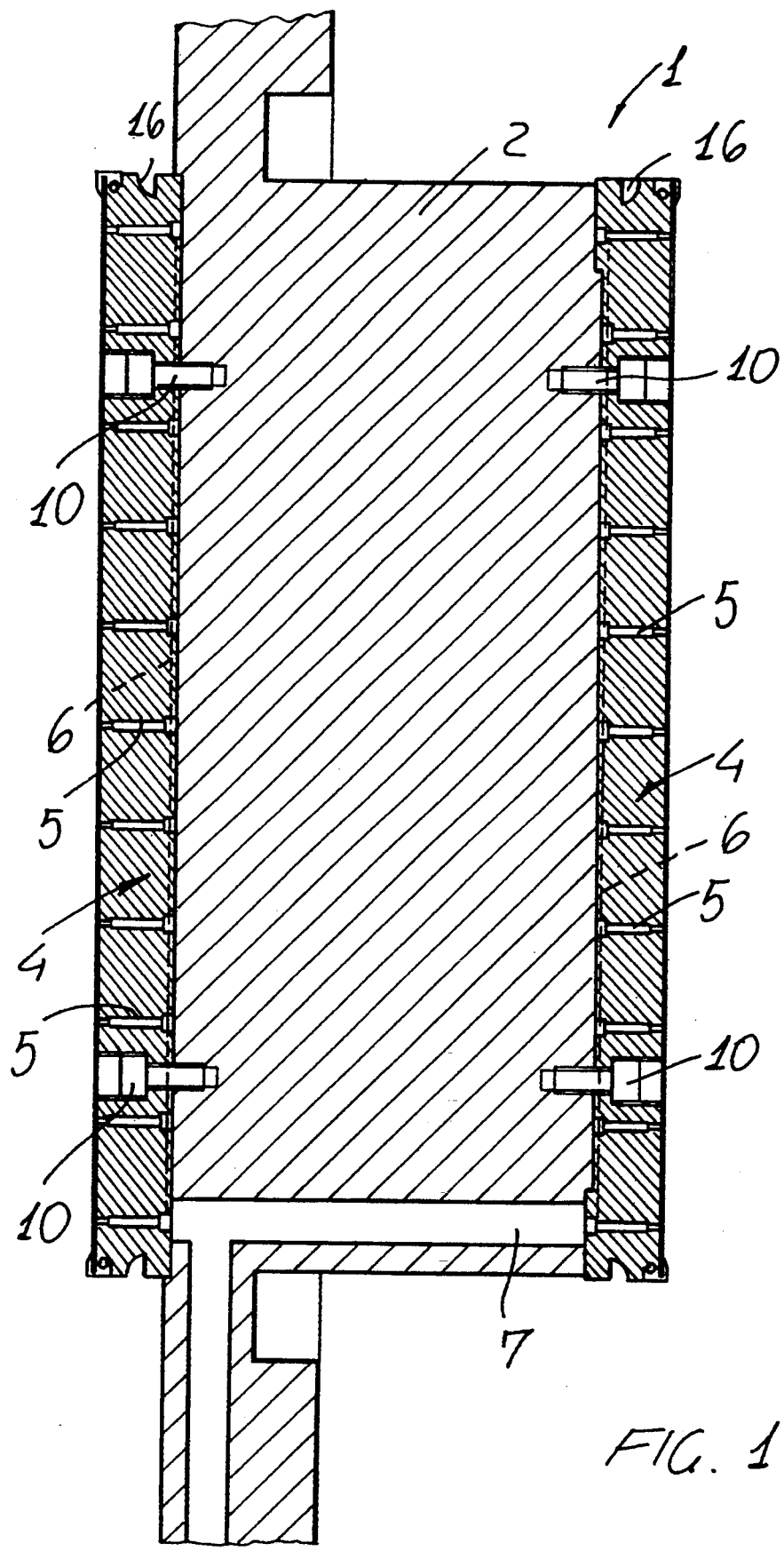
FIG. 1 is a schematic cross-sectional view illustrating a male pot according to the present invention.
Figure 2:
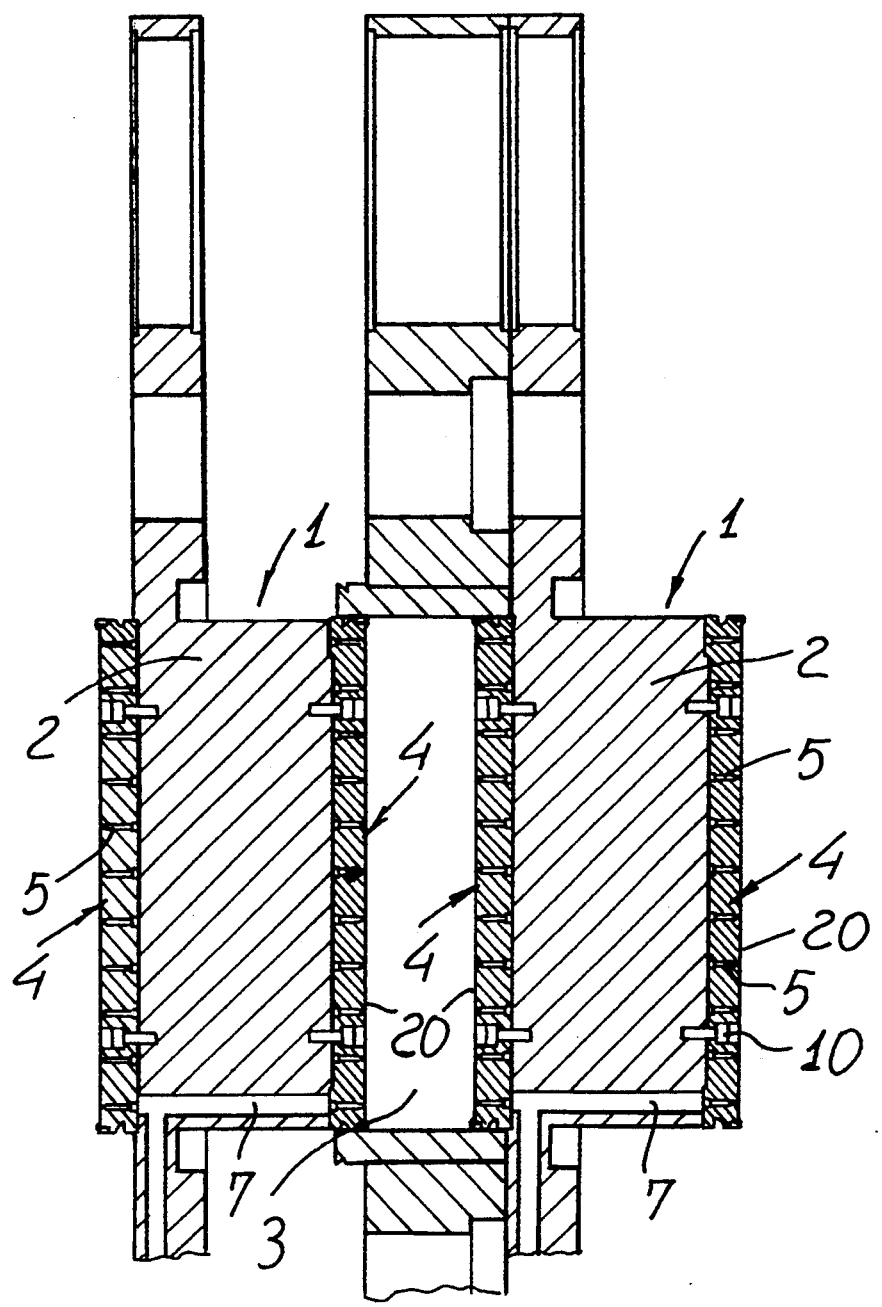
FIG. 2 is another schematic view illustrating two male pots which are mutually connected.

With reference to the figures, the male pot for presses for pressing cacao and oil seed materials, according to the present invention, which has been generally indicated at the reference number 1, comprises a body 2 provided for coupling, in a per se known manner, on a press which comprises a plurality of male pots, arranged with a cascade relationship so as to define a plurality of pots 3 into which there is supplied the material to be pressed.

On the opposite surfaces of the body 2 facing the press pots 3, there is provided a disc-shaped element 4, which is rigidly coupled to the body 2 and is provided, on the surface thereof, with a plurality of holes 5 connected with corresponding channels 6 in turn connected with a draining channel 7 for draining therefrom liquid material which can comprise cacao butter or an oil material.

The disc-shaped element 4 can comprise a disc proper, applied on the flat surface of the body 2, or a ring (not shown) to be applied on the outside of the male pot, and adapted to define a flat bearing surface.

The system for connecting the disc-shaped element to the body 2 of the male pot will be of a type allowing to hold the overall surface of the flat part fully free and available for the filtering operation.

Figure 3:
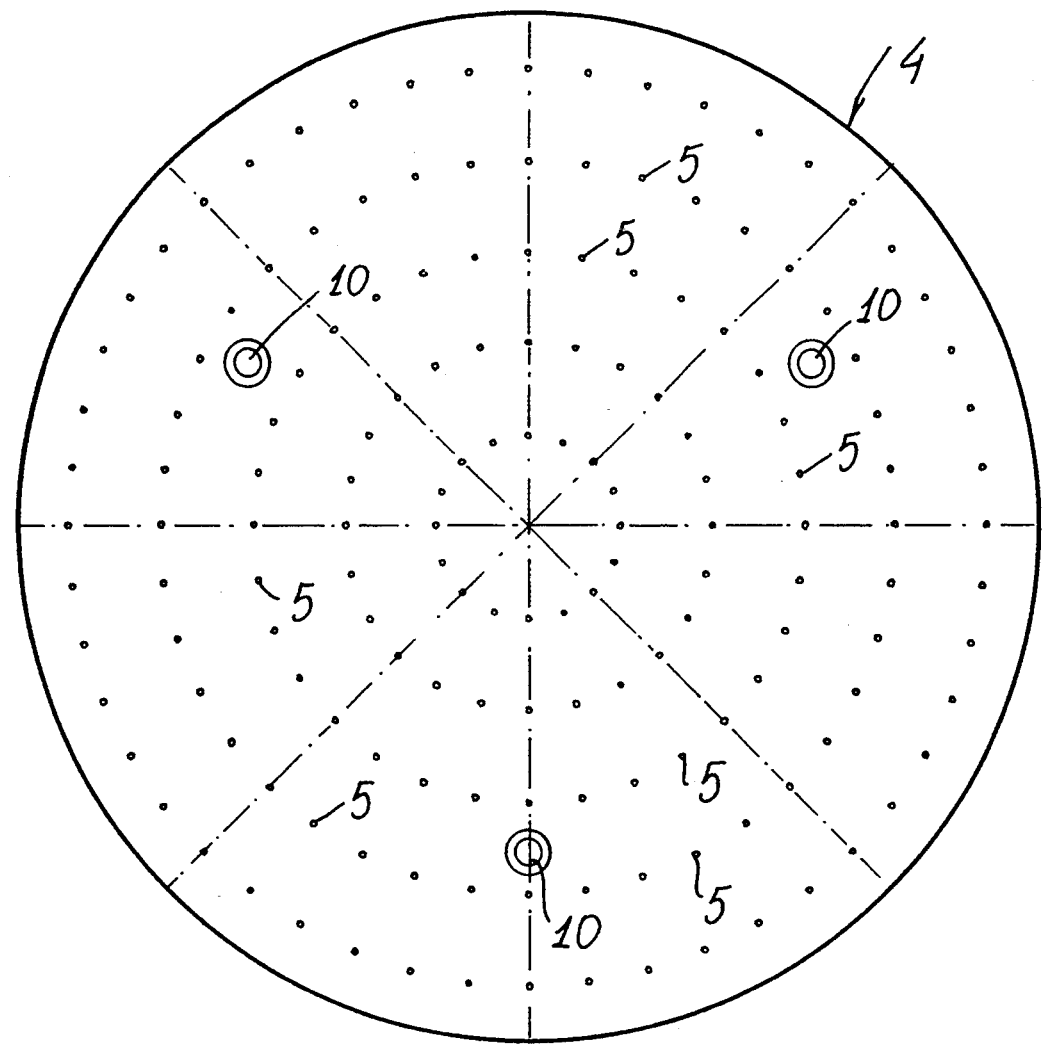
FIG. 3 is a top plan view illustrating a possible configuration of the disc-shaped element.
Figure 5:
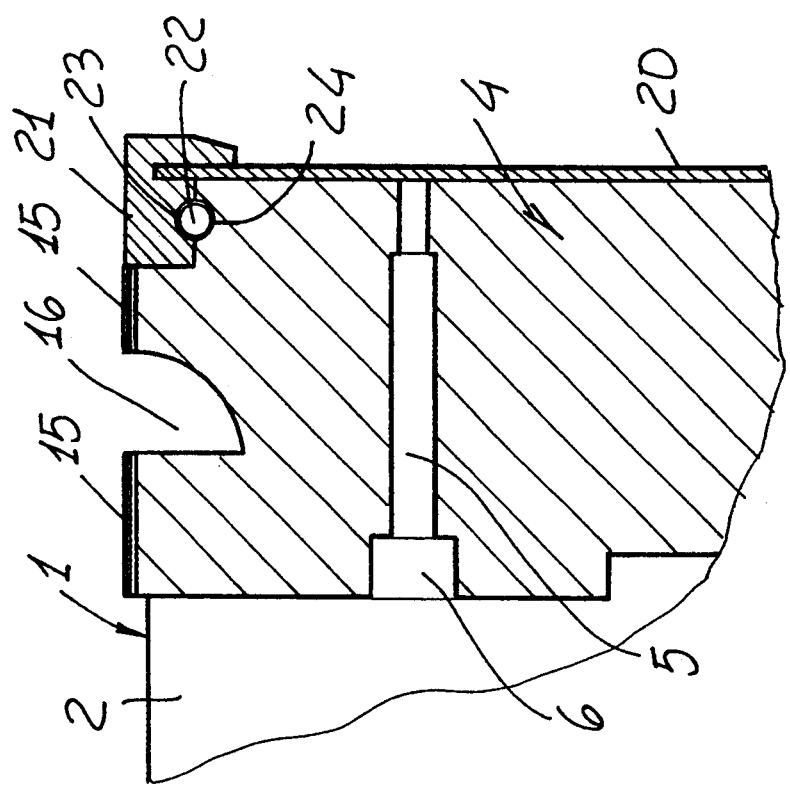
FIG. 5 illustrates, on an enlarged scale, a detail of the coupling of the disc-shaped element and the filtering cloth.
Figure 4:
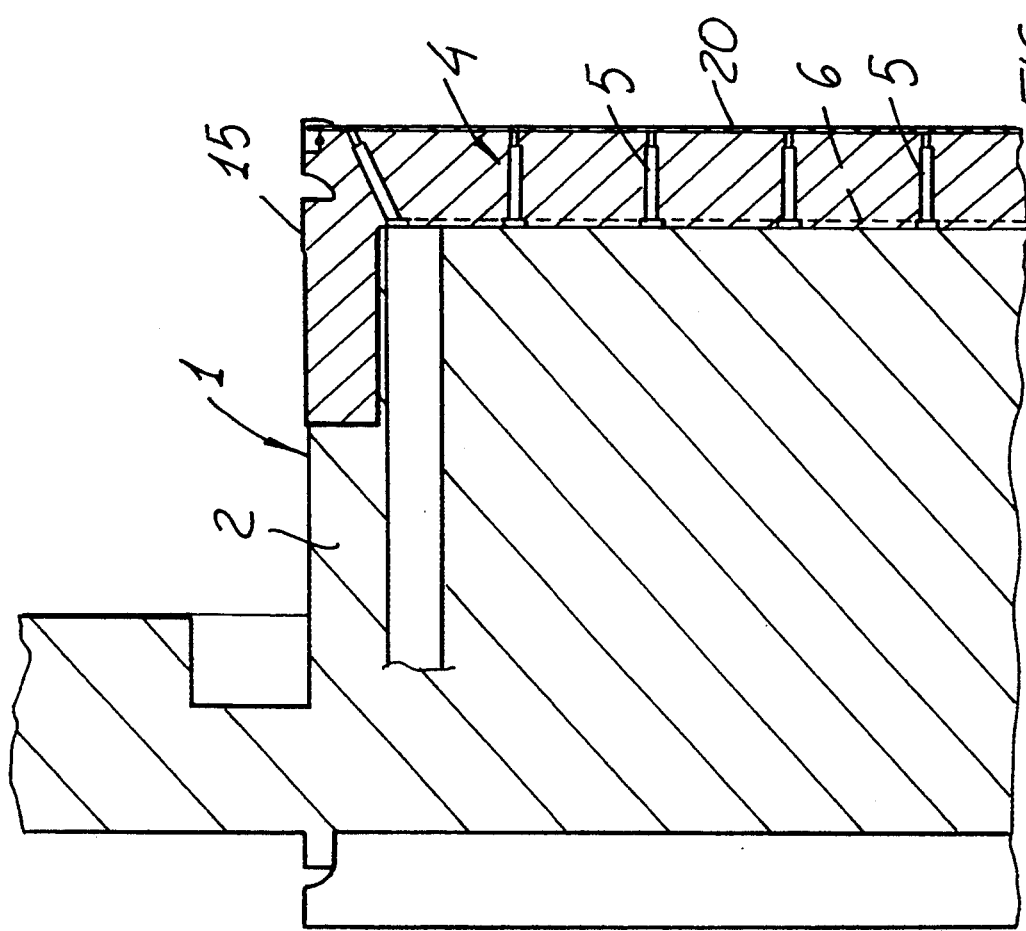
FIG. 4 illustrates a detail of the coupling between the disc-shaped element and filtering cloth.

Thus, for example, and as schematically shown in FIG. 1 and FIG. 3, screw means 10 can be provided, applied on the flat portion of the disc, but not at the holes 5 therethrough the cacao butter or oil will pass.

Thus, a larger filtering surface will be obtained, with respect to prior plates, thereby allowing to have a more homogeneous contents of the fat material in the panel, and allowing a great reduction of the restrained material, the other pressing conditions being the same.

The outer profile or contour of the disc-shaped element 4, providing the contact surface with an inner liner of the pot, will be advantageously provided with a tungsten carbide edge portion 15, having very good mechanical strength characteristics.

The tungsten carbide portion will be provided, at a middle part thereof, with a groove 16 for engaging therein a felt element providing a sealing gasket.

To the thus made disc-shaped element there is applied a single filtering cloth, that is the fine filtering cloth.

This fine cloth, indicated at the reference number 20, is peripherally held, for assembling it to a press edge, by a small ring element 21 to be affixed on the outer diameter of said disc-shaped element by any suitable connecting systems, such as, for example, by using a Sieger ring 22 engaged between an outer groove 23 formed in said small ring and an inner groove 24 formed in said disc-shaped element.

From the above disclosure it should be apparent that the male pot according to the invention allows to reproduce all of the operating condition characteristics of this type of press, with the difference of providing a disc-shaped element which is fixed with respect to the male pot, contrarily to the prior removable filtering plates.

This solution provides great advantages, owing to the tungsten carbide portion associated with the outer diameter, and owing to a specifically designed perforation arrangement and the use of a single filtering cloth which will greatly simplify all of the assembling operations.

The disclosed male pot, moreover, has a very small maintenance cost, jointly with a very good production yield since, in a comparatively small time, there is obtained a homogeneous removal of the fat substances from the material being pressed.

The invention as disclosed is susceptible to several modifications and variations, all of which will come within the scope of the invention.

Moreover, all of the details can be replaced by other technically equivalent elements.

In practicing the invention, the used materials, as well as the contingent size and shapes, can be any, depending on requirements.

I claim:

1. A male pot for cacao and oil seed material presses, said male pot comprising a male pot body provided, on opposite surfaces thereof, with a disc-shaped element rigid with said body and including a plurality of draining channels therein, said disc-shaped element including a front-flat portion adapted to be coupled to filtering cloth means and being provided with connecting means, not affecting said draining channels, for connecting said disc-shaped element to said body, wherein said disc-shaped element is further provided, on an outer perimetral portion thereof, with a tungsten carbide coating.

2. A male pot according to claim 1, wherein a groove is formed at a middle portion of said tungsten carbide coating.

* * * * *